July 4, 1961  F. M. STIEGER  2,991,208
LAMINATED STRUCTURES
Filed May 1, 1958  2 Sheets-Sheet 1
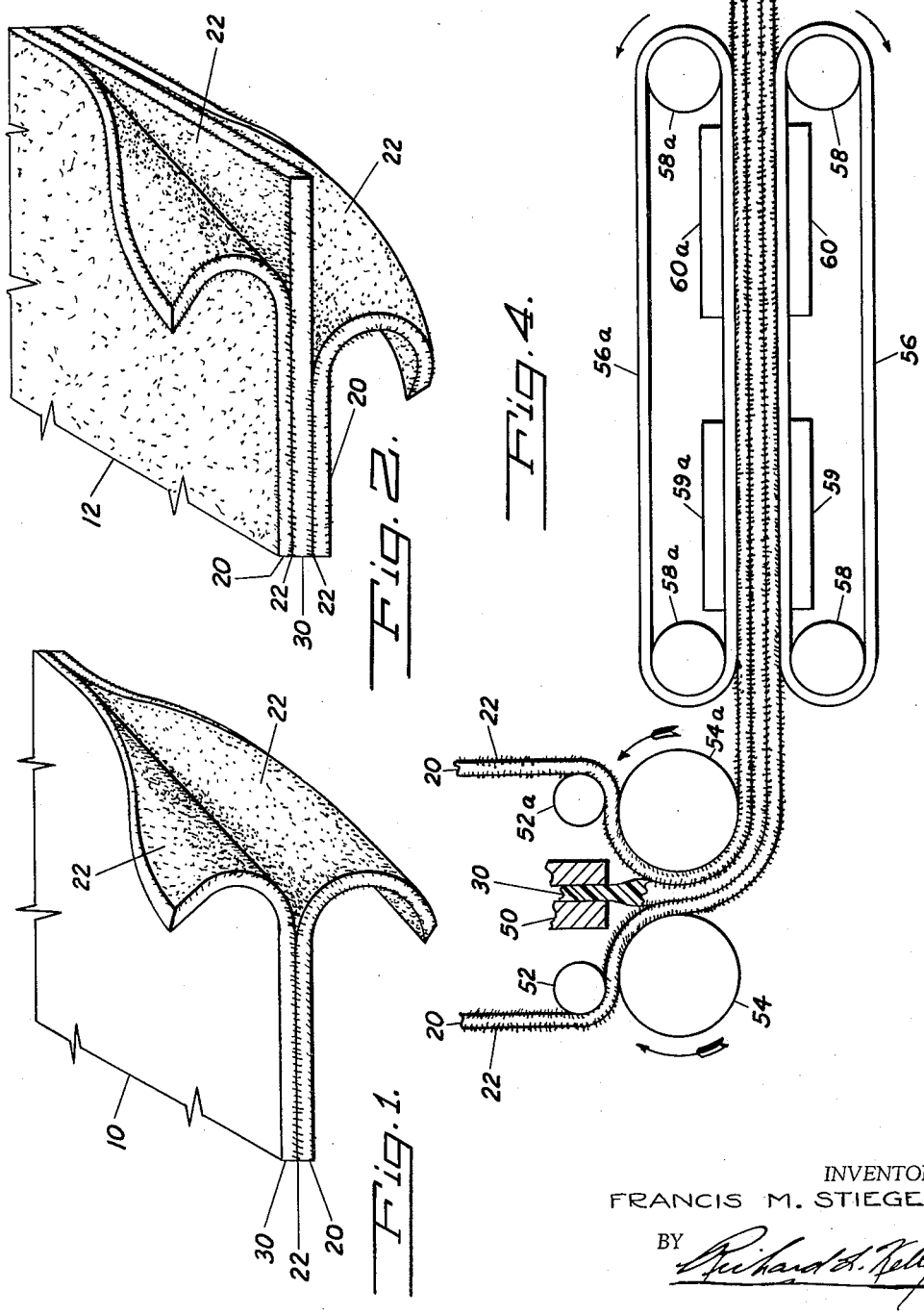
INVENTOR.
FRANCIS M. STIEGER
BY
ATTORNEY.

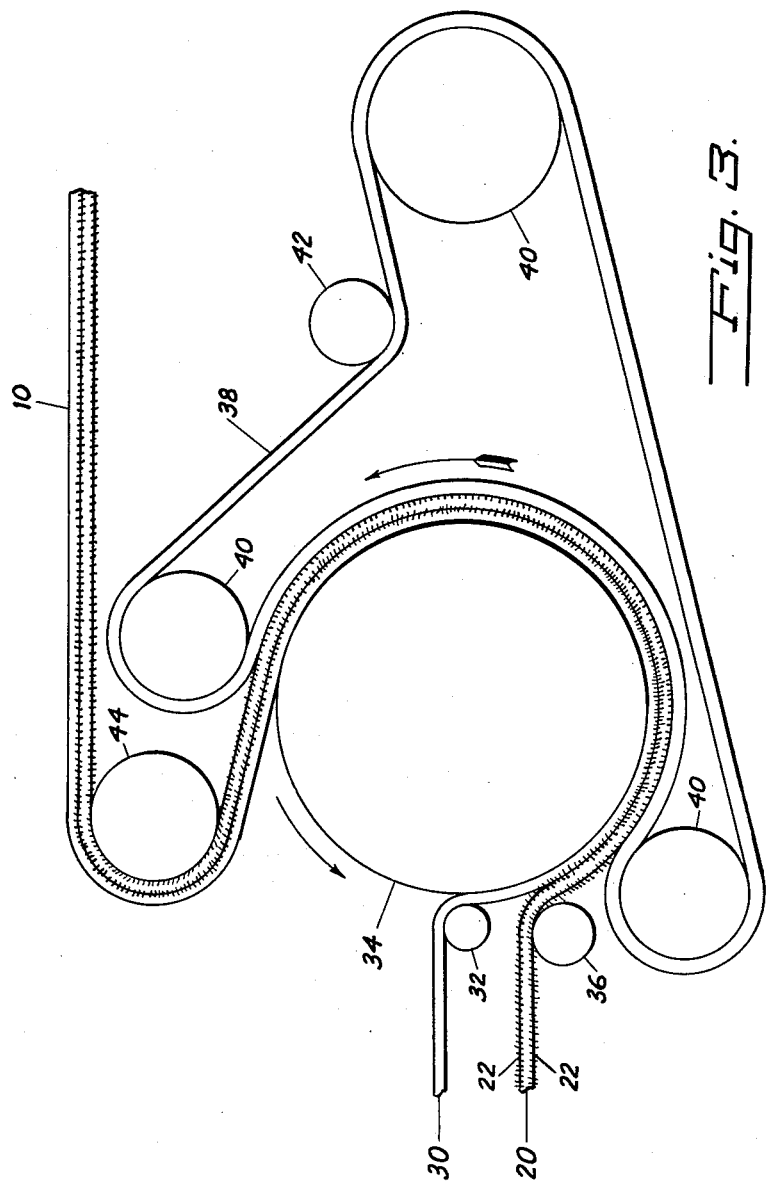

2,991,208
LAMINATED STRUCTURES

Francis M. Stieger, Springfield, Mass., assignor to Monsanto Chemical Company, St. Louis, Mo., a corporation of Delaware
Filed May 1, 1958, Ser. No. 732,293
11 Claims. (Cl. 154—46)

The present invention relates to novel laminated structures and to methods for preparing same.

For many industrial purposes it would be desirable to have available to the art laminated structures consisting of a vinyl chloride polymer film adhered to an ethylene polymer film. In particular, it would be desirable to have available such laminated structures which could be vacuum formed or otherwise thermally formed without delaminating. Such laminated structures are difficult to obtain, however, because of the problem of obtaining satisfactory adhesion between the vinyl chloride polymer film and the ethylene polymer film.

It is an object of this invention to provide laminated structures in which a vinyl chloride polymer film is laminated to at least one surface of an ethylene polymer film.

Other objects and advantages of the invention will be apparent from the following detailed description thereof when read in conjunction with the attached drawings in which:

FIG. 1 is a side view of a structure in which a vinyl chloride polymer film is laminated to an ethylene polymer film;

FIG. 2 is a side view of a laminated structure in which two vinyl chloride polymer films are laminated to opposite sides of an ethylene polymer film;

FIG. 3 schematically illustrates one method for preparing the laminated structure of FIG. 1; and FIG. 4 schematically illustrates one method for preparing the laminated structure of FIG. 2.

The above and related objects are attained by a process which consists essentially of (1) assembling the flocked surface of a vinyl chloride polymer film in touching relationship with an ethylene polymer film, (2) placing said assembly of the vinyl chloride polymer film and the ethylene polymer film under pressure, (3) heating said ethylene polymer film above its melting temperature and (4) subsequently cooling said ethylene polymer film below its melting temperature. The vinyl chloride polymer film employed in the process will have at least one of its surfaces "flocked," i.e., a multitude of short individual fibers will be partially embedded in the surface of the vinyl chloride polymer film.

The following examples are set forth to illustrate more clearly the principle and practice of this invention to those skilled in the art. Unless otherwise noted, where parts and quantities are mentioned they are parts and quantities by weight.

Example I

A laminated structure is prepared from a 0.025" film of an ethylene polymer and a 0.010" film of a plasticized vinyl chloride polymer having both of its surfaces flocked with a multitude of cotton fibers. The ethylene polymer included in the ethylene polymer film is a "high pressure" type of ethylene homopolymer of the type described in U.S. 2,153,553 and has a melting temperature of about 105° C. The vinyl chloride polymer included in the vinyl chloride polymer film is a vinyl chloride homopolymer and is plasticized with about 50 parts of dioctyl phthalate for each 100 parts of polymer. The flocked surfaces of the vinyl chloride polymer film resemble suede leather or felt in appearance and contain about 95,000 individual cotton fibers per sq. inch. The individual cotton fibers have an average length of about 0.020" and a denier of about 4.

The vinyl chloride film is placed in contact with the ethylene polymer film and the assembly is then placed in a platen press and put under a pressure of 25 lbs. per sq. inch. The press plates are heated for seven minutes with steam under a pressure of 100 pounds per sq. inch gauge and then cooled to about 30 degrees C. with cold water before removing the laminate. A very strong bond is formed between the two films and when they are pulled apart the cotton fibers, which are initially embedded in the vinyl chloride polymer, distribute themselves substantially equally between the two films.

The laminated structure prepared in this example is illustrated in FIG. 1 wherein 10 is the laminated structure, 20 is the vinyl chloride polymer film, 30 is the ethylene polymer film and 22—22 are the individual cotton fibers which lock the two films together. The lower right hand corner of the drawing graphically illustrates how the cotton fibers 22 distribute themselves between both films when the bond therebetween is broken.

The laminated structure is softened by heating and is vacuum formed into a jewel box insert liner measuring 10" x 15" x 5" employing conventional equipment and a plug assist molding technique. There is no evidence of delamination between the two films in the finished liner. This fact is highly significant, since the laminated structure is drawn 67% in one direction and 100% in the other direction and this deep draw places a severe strain upon the bond formed between the two films.

Example II

A laminated structure is prepared from an ethylene polymer film and two plasticized vinyl chloride polymer films, both of said films being described in Example I. The ethylene polymer film is placed between the two vinyl chloride polymer films and the assembly is laminated in a platen press employing the pressing cycles, temperatures and pressures specified in Example I. As in Example I, the bonds formed between the films are very strong and when the films are pulled apart the cotton fibers distribute themselves substantially equally between the two parting surfaces.

The laminated structure prepared in this example is illustrated in FIG. 2 wherein 12 is the laminated structure, 20—20 are the vinyl chloride polymer films, 30 is the ethylene polymer film and 22—22 are the individual cotton fibers which lock the films together. The lower right hand corner of the drawing illustrates the manner in which the individual cotton fibers distribute themselves substantially equally between the two parting surfaces when the bonds therebetween are broken.

The laminated structure is heat softened and vacuum formed into the upper of a slipper employing a plug assist molding technique. As in Example I, there is no delamination between the films.

A continuous method for preparing the laminated structure of FIG. 1 is illustrated in FIG. 3. Ethylene polymer film 30 from a feed roll not shown is drawn over idler roll 32 and drum 34 whose surface is internally heated by means not shown to raise the temperature of film 30 above its melting temperature. Simultaneously, vinyl chloride polymer film 20 which has both of its surfaces flocked with cotton fibers 22, is drawn over idler roll 36 at the same speed as ethylene polymer film 30. Endless belt 38 which is driven by a series of rolls 40—40 and kept in tension by roll 42 urges films 20 and 30 against drum 34 and maintains the assembly under pressure. After leaving contact with drum 34 and endless belt 38 the finished laminated structure 10 is driven over roll 44 which is internally cooled by means not shown and then to a windup roll not shown.

FIG. 4 illustrates a continuous method for preparing the laminated structure of FIG. 2. Two vinyl chloride polymer films 20—20 which have both of their surfaces flocked with cotton fibers, are drawn from feed rolls not shown over rolls 52 and 52a and rolls 54 and 54a which are driven at the same speed but in opposite directions. Ethylene polymer film 30 is prepared by extruding a melted ethylene polymer through a sheet die 50 into the space provided between the two vinyl chloride polymer films 20—20. The assembly of the three films is placed under pressure by being drawn between endless belts 56 and 56a which are driven by, respectively, drive rolls 58—58 and 58a—58a. The ethylene polymer film is heated above its melting temperature by heated platens 59 and 59a and the assembly is cooled before leaving the belt assembly by cooling platens 60 and 60a.

The ethylene polymer from which the ethylene polymer film is fabricated is preferably an ethylene homopolymer of either the so called 'high pressure" type as prepared by the method of U.S. 2,153,553, in which event the molecular weight will normally be in the range of about 15,000–35,000, or alternatively the "linear" or "low pressure" type, in which event the molecular weight will normally be in the range of about 10,000–100,000. Such linear ethylene homopolymers may be prepared by polymerizing ethylene in the presence of the heterogeneous catalyst prepared by reacting triethyl aluminium with titanium tetrachloride or titanium trichloride. In another embodiment of the invention the ethylene polymer may be an interpolymer of ethylene with an interpolymerizable vinylidene monomer such as a vinylidene aromatic hydrocarbon, e.g., styrene, vinyl toluene, etc; a halogenated ethylene, e.g., vinyl chloride, vinylidene chloride, trichloroethylene, tetrafluoroethylene, etc.; a conjugated 1,3-diene, e.g., butadiene, isoprene, etc.; an alpha, beta unsaturated monocarboxylic acid or derivative thereof, e.g., methyl acrylate, ethyle acrylate, 2-ethylhexyl acrylate, the corresponding esters of methacrylic acid, acrylonitrile, methacrylonitrile, etc.; vinyl esters of carboxylic acids, e.g., vinyl formate, vinyl acetate, etc.; vinyl alkyl ethers, e.g., vinyl methyl ether, vinyl butyl ether, etc.; esters of alpha, beta unsaturated dicarboxylic acids, e.g. diethyl maleate, etc. Such interpolymers, where employed, will normally contain at least 50 mol percent and preferably at least 80 mol percent of ethylene.

The vinyl chloride polymer included in the vinyl chloride polymer film may be either a vinyl chloride homopolymer or a vinyl chloride interpolymer. Typical of the monomers that may be included in such vinyl chloride interpolymers are vinylidene chloride; alpha, beta unsaturated monocarboxylic acids and derivatives thereof, e.g., acrylic acid, methyl acrylate, ethylacrylate, 2-ethylhexyl acrylate, the corresponding esters of methacrylic acid, acrylamide, methacrylamide, acrylonitrile, methacrylonitrile etc.; vinyl esters of carboxylic acid, e.g., vinyl formate, vinyl acetate, vinyl stearate, etc.; vinyl alkyl ethers, e.g., vinyl methyl ether, vinyl butyl ether, etc.; esters of alpha, beta unsaturated dicarboxylic acids, e.g., diethyl maleate, diethyl fumarate, etc. The vinyl chloride interpolymers employed will contain a minimum of 50 weight percent and preferably at least 80 weight percent of vinyl chloride. Such vinyl chloride homopolymers and interpolymers will usually have molecular weights in the range of about 15,000–150,000. If desired, the vinyl chloride polymer may be plasticized with about 10–150 parts of plasticizer for each 100 parts of polymer. Typical of the plasticizers that may be employed for this purpose are the phosphate esters such as tricresyl phosphate, phthalate esters such as dibutyl phthalate or diocytl phthalate, diesters of aliphatic dibasic acids such as dibutyl adipate and the polymeric plasticizers obtained by esterifying aliphatic dicarboxylic acids with glycols such as ethylene or propylene glycols.

The flocked surface of the vinyl chloride polymer film consists of a multitude of individual fibers that are partially embedded in the surface of the film. Such fibers may be of cotton, cellulose acetate, viscose rayon, nylon, synthetic acrylonitrile based fibers, wool, or other natural or synthetic fibers or blends or mixtures thereof. Where synthetic fibers are employed, they should have melting points higher than the temperatures employed in the lamination process. The fibers will have lengths varying from about 0.010" to about 0.5" and deniers ranging from about 1 to 30. Usually at least about 5,000 fibers will be present in each sq. inch of surface of the vinyl chloride polymer. The fibers may be embedded in the vinyl chloride polymer film by methods known in the art, e.g., see U.S. 2,784,630.

The ethylene polymer film and the flocked vinyl chloride polymer film can be laminated by a wide variety of processes that include the steps of; (1) assembling the flocked surface of the vinyl chloride polymer film in touching relationship with the ethylene polymer film, (2) placing the assembly of the vinyl chloride polymer film and the ethylene polymer film under pressure, (3) heating the ethylene polymer film above its melting temperature, and (4) subsequently cooling the ethylene polymer film below its melting temperature. Obviously the laminated structure should be cooled to below the melting temperature of the ethylene polymer before any stress is applied to the laminate which will tend to separate the two polymer films. Typical of the laminating equipment that can be used in carrying out the process are platen presses, drum type laminators, nip roll laminators and band and drum type laminators.

The laminated structures of the invention combine the desirable physical and chemical properties of both ethylene polymer films and vinyl chloride polymer films. A bilayered structure consisting of a single ethylene polymer film and a vinyl chloride polymer film may be employed in packaging applications in which the chemical inertness of the ethylene polymer is desired on the interior surface of the package and where it is desired to have the exterior surface highly susceptible to standard printing inks. Laminated structures which have a flocked exterior surface (see FIGS. 1 and 2) resemble suede leather in texture and may be employed in the manufacture of shoes, handbags, luggage, liners for billiard tables, etc.

The above descriptions and particularly the examples are set forth by way of illustration only. Many other variations and modifications thereof will be obvious to those skilled in the art and can be made without departing from the spirit and scope of the invention herein described.

What is claimed is:
1. The method of laminating a vinyl chloride polymer film having a flocked surface to an ethylene polymer film which comprises the sequential steps of (1) assembling said ethylene polymer film in touching relationship with the flocked surface of the vinyl chloride polymer film, (2) placing said assembly of the ethylene polymer film and the vinyl chloride polymer film under pressure and heating said ethylene polymer film above its melting temperature and (3) cooling said ethylene polymer film below its melting temperature; said flocked surface of the vinyl chloride polymer film consisting of a multitude of short individual fibers partially embedded in the surface of the vinyl chloride polymer film.

2. The method of claim 1 wherein the flocked surface of the vinyl chloride polymer film contains at least about 5,000 individual fibers per square inch, said individual fibers being approximately 0.01–0.5 inch in length and having deniers of about 1–30.

3. The method of laminating two vinyl chloride polymer films having a flocked surface to an ethylene polymer film which comprises the sequential steps of (1) assembling said ethylene polymer film in touching relationship with the flocked surfaces of the two vinyl chloride polymer films, (2) placing said assembly of the ethylene polymer film and the vinyl chloride polymer films under pressure and heating said ethylene polymer film above its melting temperature and (3) cooling the ethylene polymer film below its melting temperature; said flocked surfaces of the vinyl chloride polymer films consisting of a multitude of short individual fibers partially embedded in the surfaces of the vinyl chloride polymer films.

4. A laminated structure consisting of an ethylene polymer film and a vinyl chloride polymer film, said films being bonded together by a multitude of short individual fibers which are partially embedded in the touching surfaces of both the ethylene polymer film and the vinyl chloride polymer film.

5. A laminated structure as in claim 4 wherein at least about 5,000 individual fibers are present in each square inch of the bond line formed between the ethylene polymer film and the vinyl chloride polymer film, said individual fibers having lengths of about 0.01–0.5 inch and deniers of about 1–30.

6. A laminated structure as in claim 4 wherein a multitude of short individual fibers are partially embedded in the exposed surface of the vinyl chloride polymer film.

7. A laminated structure consisting of an ethylene polymer film and two vinyl chloride polymer films, said vinyl chloride polymer films being bonded to the two surfaces of the ethylene polymer film by a multitude of short individual fibers which are partially embedded in the touching surfaces of both the ethylene polymer film and the vinyl chloride polymer film.

8. A laminated structure as in claim 7 wherein at least about 5,000 individual fibers are present in each square inch of the bond lines formed between the ethylene polymer film and the vinyl chloride polymer films, said individual fibers having lengths of about 0.01–0.5 inch and deniers of about 1–30.

9. A laminated structure as in claim 7 wherein a multitude of short individual fibers are partially embedded in the exposed surface of the vinyl chloride polymer films.

10. The method of laminating a vinyl chloride polymer film having a flocked surface to an ethylene polymer film which comprises the sequential steps of (1) assembling said ethylene polymer film in touching relationship with the flocked surface of the vinyl chloride polymer film, (2) passing said assembly through a zone in which the assembly is placed under pressure and the ethylene polymer is heated to above its melting temperature, and (3) removing the assembly from said heat and pressure zone and cooling the ethylene polymer film to below its melting temperature; said flocked surface of the vinyl chloride polymer film consisting of a multitude of short individual fibers partially embedded in the surface of the vinyl chloride polymer film.

11. The method of laminating two vinyl chloride polymer films having a flocked surface to an ethylene polymer film which comprises the sequential steps of (1) assembling said ethylene polymer film in touching relationship with the flocked surfaces of the two vinyl chloride polymer films, (2) passing said assembly through a zone in which the assembly is placed under pressure and the ethylene polymer is heated to above its melting temperature, and (3) removing the assembly from said heat and pressure zone and cooling the ethylene polymer film to below its melting temperature; said flocked surfaces of the vinyl chloride polymer films consisting of a multitude of short individual fibers partially embedded in the surfaces of the vinyl chloride polymer films.

References Cited in the file of this patent

UNITED STATES PATENTS

| | | |
|---|---|---|
| 2,494,848 | Whitelegg | Jan. 17, 1950 |
| 2,534,113 | Egger | Dec. 12, 1950 |
| 2,697,058 | Lasak | Dec. 14, 1954 |
| 2,815,308 | Robinson et al. | Dec. 3, 1957 |
| 2,828,237 | Rosser | Mar. 25, 1958 |

FOREIGN PATENTS

| | | |
|---|---|---|
| 742,710 | Great Britain | Jan. 4, 1956 |